United States Patent [19]

Beall et al.

[11] 4,140,645

[45] Feb. 20, 1979

[54] GLASSES AND GLASS-CERAMICS SUITABLE FOR INDUCTION HEATING

[75] Inventors: George H. Beall, Big Flats; Richard F. Reade, Corning, both of N.Y.

[73] Assignee: Corning Glass Works, Corning, N.Y.

[21] Appl. No.: 914,342

[22] Filed: Jun. 12, 1978

[51] Int. Cl.$^2$ .................. C03C 3/22; C04B 35/14; C04B 35/26; H01F 1/34
[52] U.S. Cl. .................. 252/62.58; 252/62.59; 252/62.6; 252/62.61; 106/39.6; 106/39.7
[58] Field of Search .................. 106/39.6, 39.7; 252/62.58, 62.59, 62.6, 62.61

[56] References Cited

U.S. PATENT DOCUMENTS

| | | | |
|---|---|---|---|
| 3,193,503 | 7/1965 | Smith | 106/39.6 |
| 3,694,360 | 9/1972 | Weaver | 106/39.6 |
| 3,741,740 | 6/1973 | Pirooz | 106/39.7 |
| 3,926,602 | 12/1975 | Andrus | 106/39.7 |
| 4,042,519 | 8/1977 | Weaver | 106/39.6 |
| 4,043,821 | 8/1977 | LeBras | 106/39.6 |
| 4,083,709 | 4/1978 | Reade | 106/39.7 |
| 4,083,727 | 4/1978 | Andrus et al. | 106/39.7 |

*Primary Examiner*—O. R. Vertiz
*Assistant Examiner*—Mark Bell
*Attorney, Agent, or Firm*—Clinton S. Janes, Jr.

[57] ABSTRACT

The instant invention relates to the production of glass and glass-ceramic compositions containing a ferrimagnetic crystal phase throughout which respond thermally to fields generated by induction coils. Magnetite ($Fe_3O_4$) is the preferred ferrimagnetic crystal phase because of its high permeability and low resistivity ($\sim 10^{-4}$ ohm-cm) at room temperature as well as the relative low cost of iron when compared with other ferrimagnetic species. Two general composition areas are of interest: $Na_2O$ and/or $K_2O$-$FeO$-$B_2O_3$-$SiO_2$ and $Li_2O$-$Al_2O_3$-$B_2O_3$-$SiO_2$. Where the coefficient of thermal expansion is sufficiently low to impart good thermal shock resistance, the compositions can be considered for top-of-stove cooking vessels.

3 Claims, No Drawings

GLASSES AND GLASS-CERAMICS SUITABLE FOR INDUCTION HEATING

BACKGROUND OF THE INVENTION

New, energy-efficient stoves have been designed which utilize magnetic induction as the source of heat, rather than electrical resistance or gaseous combustion. Cooking utensils for use with such stoves have conventionally been made from ferromagnetic metals such as cast iron and magnetic steel. The mechanism of heating with such materials is predominantly resistance heating caused by eddy currents induced in the ferromagnetic metal. It has been recognized that another class of materials could also be useful in such an application. Such materials would contain a significant proportion of a ferrimagnetic crystal phase, which crystals respond thermally to fields generated by induction coils, the degree of response appearing to be not only directly related to the magnetic permeability of the crystal phase, but also being dependent upon the microstructure and volume percent of the crystal phase. The magnetic characteristics of the crystal phase serve to concentrate the magnetic flux from an induction source into the material. Thermal energy giving rise to heating effects results primarily from magnetic hysteresis and dielectric and resistive losses; hence, a different heating mechanism from that of the ferromagnetic metal. Magnetite is deemed to be the preferred ferrimagnetic crystal phase.

U.S. Pat. No. 4,083,727 discloses the manufacture of glass-ceramic articles having compositions within the $Li_2O-Al_2O_3-SiO_2-TiO_2$ system wherein the predominant crystal phase is beta-quartz solid solution and/or beta-spodumene solid solution, but which have a thin, integral surface film containing crystals exhibiting the structure of magnetite. The method of that invention contemplates two basic steps. (1) A glass article having a particular composition is heat treated in an oxidizing atmosphere to yield a glass-ceramic article containing beta-quartz solid solution and/or beta-spodumene solid solution as the predominant crystal phase in the interior portion of the article. Also during that heat treatment, a thin surface layer is developed in situ on the glass-ceramic article containing hematite crystals. (2) The glass-ceramic article is heat treated in a $H_2O$-containing reducing environment to convert the hematite crystals in the surface layer to magnetite. The compositions of those articles consist essentially, in weight percent on the oxide basis, of about 1–6% FeO, 3–10% $Li_2O$, 15–40% $Al_2O_3$, 40–75% $SiO_2$, and 2–7% $RO_2$, wherein $RO_2$ consists of 2–6% $TiO_2$ and 0–3% $ZrO_2$. FeO levels above 6% are eschewed as leading to cracking, crazing, and dicing of the articles.

U.S. Pat. No. 4,084,973 describes the production of glass articles having compositions within the $R_2O-Al_2O_3-SiO_2$ field, wherein $R_2O$ consists of $Li_2O$, $Na_2O$, and/or $K_2O$. When the glasses are heat treated in an oxidizing environment, a thin surface layer containing hematite crystals (alpha-$Fe_2O_3$) is developed in situ. The hematite crystals can be subsequently reduced to magnetite crystals via heat treatment in a $H_2O$-containing environment.

The compositions of those glasses consist essentially, in weight percent on the oxide basis, of about 1–15% $R_2O$, where $R_2O$ consists of 0–10% $Li_2O$ and 0–15% $Na_2O$ and/or $K_2O$, 0.3–13% FeO, 15–35% $Al_2O_3$, 55–80% $SiO_2$, and 0–5% $TiO_2$ and/or $ZrO_2$. The presence of $TiO_2$ is stated to control the in situ development of the surface crystallization such that a thin, mirror-like film development is favored. Further, the inclusion of $TiO_2$ and/or $ZrO_2$ is declared to improve the thermal stability of the surface crystalline films.

Heat treatment temperatures of 675°–950° C. are utilized to develop the surface crystallization of hematite. Higher temperatures are cautioned as hazarding the growth of crystals in the interior of the glass having low coefficients of thermal expansion, e.g., beta-quartz solid solution and/or beta-spodumene solid solution.

U.S. Pat. No. 3,193,503 discloses the production of glass-ceramic articles consisting essentially, by weight, of 16–50% MgO, 37–60% $Fe_2O_3$, 20–45% $SiO_2$, and 0–15% of mineralizers or nucleants such as $CaF_2$, CoO, NiO, $V_2O_5$, $MoO_3$, and $ThO_2$. The resultant articles are termed "magnetic ceramic ferrites" but no crystallization identification data are provided.

U.S. Pat. No. 3,694,360 describes the manufacture of glass-ceramics exhibiting ferrimagnetic properties. The compositions therefor consist essentially, in parts by weight, of 35–55% $Fe_2O_3$, 5–15% $Li_2O$, 10–50% $SiO_2$, and 1–15% ZnO. The predominant crystal phase is lithium ferrite.

U.S. Pat. No. 3,741,740 is concerned with the formation of glass-ceramic articles from glasses consisting essentially, by weight, of 3–5% $Li_2O$, 0.6–5% $Fe_2O_3$, 18–22% $Al_2O_3$, 60–70% $SiO_2$, and 2–7% of a nucleant selected from the group $TiO_2$, $ZrO_2$, $SnO_2$, $P_2O_5$, and $Cr_2O_3$. Upon heat treatment of the precursor glass article in a non-reducing atmosphere, a high quartz solid solution phase is developed in the interior portion of the article and an integral reflective surface film is formed. Neither the composition nor the microstructure of the surface film is disclosed.

U.S. Pat. No. 3,492,237 describes glass-ceramic articles having compositions within the $Li_2O-Na_2O-Al_2O_3-Fe_2O_3-SiO_2$ field wherein lithium ferrite is a primary crystal phase. The articles have a mole ratio of $SiO_2$, $Na_2O$, and $Al_2O_3$ of 11-13:3-4:4-1 with 1–10 moles each of $Fe_2O_3$ and $Li_2O$ per mole of $Al_2O_3$. Crystals of acmite and possibly albite are also present with the lithium ferrite.

U.S. Pat. No. 3,503,763 is directed to devitrifying solder glasses which crystallize in situ to produce crystals of beta-eucryptite or beta-spodumene. The compositions of the glasses consist essentially, by weight, of 13–23% PbO, 4–11% $B_2O_3$, 4–6% $Li_2O$, 14–19% $Al_2O_3$, 39–50% $SiO_2$, 1–6% $TiO_2$ and/or 1–3% $ZrO_2$, and 2–5% iron oxide when the amount of $B_2O_3$ is 4–6%. The iron oxide is stated to aid nucleation and is used to replace part of the $B_2O_3$ because of its strong fluxing action.

U.S. Pat. No. 3,929,497 is drawn to the preparation of glass-ceramic fibers consisting essentially, by weight, of 5–15% $Na_2O$, 5–15% $Fe_2O_3$, 5–15% MgO, 10–15% CaO, 10–15% $Al_2O_3$, 45–50% $SiO_2$, and 0.5–5% $TiO_2$. X-ray diffraction analyses identified diopside as the principal crystal phase and magnetite was not found.

U.S. Pat. No. 3,962,514 discloses glass-ceramic articles having exuded transition metal spinel surface films thereon. The base compositions therefor consist essentially, by weight, of 14–35% $Al_2O_3$, 55–80% $SiO_2$, 0–5% $Li_2O$, 3–13% $RO_2$, wherein $RO_2$ consists of 0–7% $TiO_2$ and 0–10% $ZrO_2$, 0–3% F, and 0.1–10% transition metal oxides selected from the group of 0.5% $MnO_2$, 0–5% $Fe_2O_3$, 0–3% CoO, 0–2% CuO, 0–2% $Cr_2O_3$, 0–3% $V_2O_5$, and 0–10% NiO. Upon being crystallized in situ, the glasses are converted into glass-ceramic articles containing beta-quartz or beta-spodumene type crystals as the principal phase. The glass-ceramic articles are thereafter heat treated under reducing conditions to cause the exudation of a transition metal compound exhibiting a spinel structure. Such compounds included $Mn_3O_4$, $Fe_3O_4$, $NiAl_2O_4$, $CoAl_2O_4$, $CuCr_2O_4$, $MnCr_2O_4$, $CrAl_2O_4$, $Co_3O_4$, $FeCr_2O_4$, $CoFe_2O_4$, $MnFe_2O_4$ and $CoMn_2O_4$. Those crystal phases are not reported as being present in the interior of the article.

U.S. Pat. No. 3,926,602 describes the production of glass-ceramic articles having beta-quartz solid solution or beta-spodumene solid solution crystals in the interior portion of the articles and an integral surface layer exhibiting a reflective metallic luster consisting of hematite (alpha-$Fe_2O_3$) crystals dispersed in a glassy matrix. The base composition therefor consist essentially, by weight, of 0.5–3.5% FeO, 3–6% $Li_2O$, 16–21% $Al_2O_3$, 65–75% $SiO_2$, and 1.5–7% $RO_2$, wherein $RO_2$ consists of 1.5–6% $TiO_2$ and 0–3% $ZrO_2$.

It will be appreciated that, as a matter of convenience, the above patents report the total iron oxide content of the inventive materials, present as a combination of FeO and $Fe_2O_3$, as either "FeO" or "$Fe_2O_3$". Thus, for the sake of simplicity and because the materials were apparently not analyzed for the individual proportions of FeO and $Fe_2O_3$, the full amount of the iron oxide content was expressed as either "FeO" or "$Fe_2O_3$."

OBJECTIVES OF THE INVENTION

The primary objective of the instant invention is to provide glasses and glass-ceramics which can be relatively rapidly heated inductively to several hundred degrees centigrade.

A more specific objective is to provide glasses and glass-ceramics having the capability of being inductively heated, but which also have a sufficiently low coefficient of thermal expansion to impart the necessary thermal shock resistance thereto for utility as top-of-stove cooking vessels.

SUMMARY OF THE INVENTION

The glasses of the instant invention which demonstrate efficient and uniform heating when placed in an oscillating magnetic field (arbitrarily chosen as rising from room temperature to 250° C. or higher in three minutes) customarily exhibit coefficients of thermal expansion (0°–300° C.) in excess of $40 \times 10^{-7}/°$ C. As such, most of the glasses do not possess the necessary thermal shock resistance for top-of-stove ware but can be useful in other applications where rapid temperature changes are not experienced.

Such glasses can be produced from compositions, expressed in terms of weight percent on the oxide basis as calculated from the batch, selected from the groups (a) 2–10% $Na_2O$ and/or $K_2O$, 5–20% $B_2O_3$, 15–40% FeO, 0–32% $Al_2O_3$, and 35–65% $SiO_2$; and (b) 1.5–6% $Li_2O$, 10–40% FeO, 10–20% $Al_2O_3$, 45–66% $SiO_2$, 0–5% $TiO_2$ and/or $ZrO_2$, and 0–5% $B_2O_3$, at least 1% $B_2O_3$ being required when the proportion of FeO is less than 15%.

As was explained above with respect to the prior art patent literature, the total iron oxide content is conveniently reported here as FeO.

Both groups of compositions spontaneously precipitate magnetite ($Fe_3O_4$) when the molten batch is cooled to a glass article and annealed. The amount of magnetite precipitated tends to increase and, hence, the inductive heating effect also tends to increase at higher levels of iron oxide. Two other factors, however, are also important in achieving a highly efficient heaing performance; viz., the presence of $B_2O_3$ and the inclusion of $TiO_2$ and/or $ZrO_2$ in small amounts, if present at all. Both factors tend to promote spontaneous crystallization of magnetite throughout the body of the glass. At FeO levels less than those stated above and when normal oxidizing conditions are employed in the melting step, viz., melting in an air temperature, hematite (alpha-hematite) which is non-magnetic appears to crystallize preferentially, thereby diminishing the inductive heating capability of the glass. The inclusion of certain other transition metals in the base composition leads to the crystallization of transition metal ferrites which are less magnetic than magnetite and, hence, impair the inductive heating efficiency of the glass. The addition of other transition metals greatly increases the batch cost for no particular substantive advantage. However, part of the FeO can be replaced with MnO and/or ZnO without serious adverse effect upon the ferrimagnetic properties of the materials.

The glass-ceramic articles of the instant invention which exhibit efficient and uniform inductive heating can be produced via heat treatment of glass compositions, expressed in terms of weight percent on the oxide basis as calculated from the batch, selected from the groups.

(a) 2–10% $Na_2O$ and/or $K_2O$, 5–20% $B_2O_3$, 15–40% FeO, 15–32% $Al_2O_3$, and 35–50% $SiO_2$; and (b) 1.5–6% $Li_2O$, 10–40% FeO, 10–20% $Al_2O_3$, 45–66% $SiO_2$, 0–5% $TiO_2$ and/or $ZrO_2$, and 0–5% $B_2O_3$, at least 1% $B_2O_3$ being required when the proportion of FeO is less than 15%.

Again, the total iron oxide content is reported as FeO.

The glass-ceramic articles of the two groups manifest different microstructures and crystal contents. For example, the Group (a) compositions spontaneously develop magnetite as the batch is cooled from the melt. Heat treatment of the magnetite-containing glasses resulted in the development of mullite. In the absence of $Al_2O_3$, heat treatment of the Group (a) glasses gives rise to only surface crystallization, cristobalite customarily developing. The Group (a) compositions appear to be greater than 50% by volume crystalline and customarily exhibit coefficients of thermal expansion (0°–300° C.) in excess of $40 \times 10^{-7}/°$ C. The Group (b) compositions give rise to the growth of beta-quartz solid solution and/or beta-spodumene solid solution crystals, thereby resulting in highly crystalline, i.e., greater than 50% by volume, bodies generally exhibiting coefficients of thermal expansion no higher than about $40 \times 10^{-7}/°$ C. and frequently less than $25 \times 10^{-7}/°$ C. Such low coefficients of thermal expansion recommend those materials for applications where good resistance to thermal shock is demanded, e.g., top-of-stove cooking vessels.

The glass articles of the present invention are prepared by melting batches of the proper composition, simultaneously cooling and shaping the melt into a glass article, and then annealing the article to room temperature.

The inventive glass-ceramic articles are produced utilizing the following three general steps:
(1) batches of the appropriate compositions are melted;

(2) the melts are simultaneously cooled to a temperature at least within the transformation range and glass articles of desired configuration shaped therefrom; and, thereafter, (3) the glass articles are subjected to temperatures within the range of about 800°–1100° C. for a period of time sufficient to cause the in situ growth of crystals.

The transformation range has been defined as that temperature at which a glass melt is considered to have been transformed into an amorphous solid. Conventionally, that temperature has been adjudged to lie in the vicinity of the glass annealing point.

As is well-known in the glass-ceramic art, the rate of crystal growth is a direct function of the heat treating temperature employed. Consequently, longer exposure periods will be required at the cooler extreme of the crystallization range to attain the same degree of growth. Furthermore, to insure a very uniformly fine-grained crystallization, a preliminary nucleation heat treatment at about 700°–800° C. will commonly be utilized followed by the crystallization heat treatment.

Examination of the inventive glass-ceramic bodies has indicated a highly crystalline, very fine-grained microstructure. Thus, the crystals are less than five microns in diameter with the large majority being no more than about 1 micron in diameter.

DESCRIPTION OF PREFERRED EMBODIMENTS

Table I reports a group of approximate glass compositions, expressed in terms of parts by weight on the oxide basis, demonstrating the operable parameters of the instant invention. Since the sum of the constituents totals or approximately totals 100, for all practical purposes the reported values can be deemed to be expressed in weight percent. The actual batch ingredients can comprise any materials, either an oxide or other compound, which, when melted together with the other batch materials, will be converted into the desired oxide in the proper proportions. Inasmuch as it is not known with which cation(s) the fluoride is combined, it is merely recorded in terms of the batch ingredient utilized. $As_2O_3$ was included in a number of the recited compositions to perform its conventional function as a fining agent. The total iron oxide content is tabulated as FeO.

The batch ingredients were compounded, mixed together in a ball mill to aid in attaining a homogeneous melt, and the mixture deposited into platinum crucibles. The crucibles were placed into a gas-fired furnace, melted at 1500°–1650° C. for about 5–16 hours, the melts cast into 6 × 6 × ½ inches steel molds or poured onto a steel plate to produce rounded slabs having a diameter of about 10–12 inches, and then immediately transferred to annealers operating at about 400°–650° C.

Table IA reports wet chemical iron oxide analyses in weight percent performed upon several of the exemplary glasses of Table I.

TABLE I

|  | 1 | 2 | 3 | 4 | 5 | 6 | 7 |
|---|---|---|---|---|---|---|---|
| $SiO_2$ | 65.4 | 63.7 | 62.2 | 61.6 | 60.3 | 59.0 | 60.8 |
| $Al_2O_3$ | 17.4 | 16.9 | 16.5 | 16.2 | 16.2 | 16.2 | 16.4 |
| $B_2O_3$ | 3.0 | 2.9 | 2.9 | 1.4 | 2.8 | 4.1 | 2.8 |
| $Li_2O$ | 4.8 | 4.7 | 4.6 | 4.5 | 4.5 | 4.4 | 4.5 |
| FeO | 6.2 | 8.6 | 10.8 | 12.9 | 12.8 | 12.8 | 13.0 |
| $TiO_2$ | 1.3 | 1.3 | 1.2 | 1.4 | 1.4 | 1.4 | 1.0 |
| $ZrO_2$ | 1.3 | 1.3 | 1.3 | 1.5 | 1.5 | 1.5 | 1.0 |
| $As_2O_3$ | 0.6 | 0.6 | 0.6 | 0.6 | 0.6 | 0.6 | 0.6 |

TABLE I-continued

|  | 8 | 9 | 10 | 11 | 12 | 13 | 14 |
|---|---|---|---|---|---|---|---|
| $SiO_2$ | 57.0 | 59.4 | 59.4 | 58.9 | 58.8 | 57.7 | 57.7 |
| $Al_2O_3$ | 18.0 | 16.1 | 16.0 | 15.8 | 15.7 | 15.5 | 15.5 |
| $B_2O_3$ | 3.1 | 2.7 | 2.7 | 2.7 | 2.7 | 2.7 | 2.7 |
| $Li_2O$ | 4.9 | 3.5 | 3.5 | 3.5 | 4.3 | 4.3 | 4.3 |
| FeO | 14.3 | 12.7 | 12.7 | 12.6 | 16.6 | 10.9 | 10.9 |
| $TiO_2$ | 1.1 | 1.4 | 1.4 | 1.4 | 1.4 | 1.4 | 1.4 |
| $ZrO_2$ | 1.1 | 1.5 | 1.5 | 1.4 | 1.4 | 1.4 | 1.4 |
| $As_2O_3$ | 0.7 | 0.6 | 0.6 | 0.6 | 0.6 | 0.6 | 0.6 |
| CaO | — | 1.7 | — | — | — | — | — |
| ZnO | — | — | 2.4 | — | — | — | — |
| $La_2O_3$ | — | — | — | 3.2 | — | — | — |
| CoO | — | — | — | — | — | 5.7 | — |
| NiO | — | — | — | — | — | — | 5.7 |

|  | 15 | 16 | 17 | 18 | 19 | 20 | 21 |
|---|---|---|---|---|---|---|---|
| $SiO_2$ | 54.1 | 62.0 | 55.2 | 48.0 | 57.1 | 54.8 | 62.5 |
| $Al_2O_3$ | 18.2 | 14.0 | 14.4 | 14.4 | 5.2 | — | 2.1 |
| $B_2O_3$ | 2.5 | — | — | 2.4 | 15.6 | 9.9 | 12.5 |
| $Li_2O$ | 2.4 | 3.0 | 2.4 | 2.4 | — | — | — |
| FeO | 20.5 | 18.0 | 21.6 | 25.9 | 16.8 | 20.2 | 18.5 |
| $TiO_2$ | 0.9 | — | 2.0 | 2.0 | — | — | — |
| $ZrO_2$ | 0.9 | — | 2.0 | 2.0 | — | 5.0 | — |
| $As_2O_3$ | 0.5 | — | — | — | — | — | — |
| MgO | — | 1.0 | — | — | — | — | — |
| $Na_2O$ | — | — | — | — | 5.2 | 5.0 | 4.2 |
| CaO | — | — | — | — | — | 4.9 | — |

|  | 22 | 23 | 24 | 25 | 26 | 27 | 28 |
|---|---|---|---|---|---|---|---|
| $SiO_2$ | 34.8 | 35.8 | 35.8 | 41.9 | 44.6 | 52.4 | 54.9 |
| $B_2O_3$ | 10.2 | 10.4 | 15.6 | 15.7 | 14.9 | 20.9 | 14.8 |
| $Al_2O_3$ | 29.4 | 30.2 | 25.0 | 10.5 | 5.0 | — | — |
| FeO | 16.2 | 18.7 | 18.7 | 21.3 | 20.2 | 21.3 | 20.1 |
| $Na_2O$ | — | — | — | 10.5 | 5.0 | 5.2 | 5.0 |
| NaF | 4.1 | 4.2 | 4.2 | — | — | — | — |
| CaO | — | — | — | — | 5.0 | — | — |
| $TiO_2$ | 3.0 | — | — | — | — | — | — |
| $ZrO_2$ | — | — | — | — | 5.0 | — | 5.0 |
| $AlF$ | 0.5 | 0.5 | 0.5 | — | — | — | — |

|  | 29 | 30 | 31 | 32 | 33 |
|---|---|---|---|---|---|
| $SiO_2$ | 49.8 | 51.9 | 47.3 | 46.5 | 46.2 |
| $Al_2O_3$ | 16.7 | 14.0 | 19.1 | 15.8 | 12.4 |
| $B_2O_3$ | 2.3 | 2.4 | 2.2 | 2.7 | 2.1 |
| $Li_2O$ | 3.7 | 3.1 | 2.1 | 2.6 | 2.7 |
| FeO | 23.6 | 24.6 | 26.9 | 27.8 | 32.8 |
| $TiO_2$ | 2.0 | 2.1 | 1.2 | 2.3 | 1.8 |
| $ZrO_2$ | 2.0 | 2.1 | 1.3 | 2.4 | 1.9 |

TABLE IA

| Example | Total Iron As FeO | Ferrous Iron As FeO | Ferrous Iron/Total Iron |
|---|---|---|---|
| 7 | 12.9% | 6.5% | ~50% |
| 10 | 12.6% | 6.4% | ~51% |
| 18 | 26.6% | 12.7% | ~48% |
| 31 | 26.0% | 13.4% | ~52% |
| 32 | 26.9% | 11.5% | ~43% |
| $Fe_3O_4$ | (theoretical) |  | ~33% |

The following calculations can be made if one wishes to express the total iron oxide content as $FeO + Fe_2O_3$. Thus, using Example 18 from Table IA, the FeO content is 12.7%. The $Fe_2O_3$ content is calculated as:

Total iron as $$FeO\ (26.6\%) - FeO\ (12.7\%) / \frac{Mol.\ Wt.\ FeO}{Mol.\ Wt.\ Fe_2O_3}\ (0.9) = 15.4\%$$

Therefore, $FeO + Fe_2O_3 = 12.7\% + 15.4\% = 28.1\%$ The ratio presented in the final column of Table IA with respect to Example 18 illustrates that ~48% of the iron ions are in the ferrous ($Fe^{+2}$) state and ~52% are in the ferric ($Fe^{+3}$) state.

Table II records a visual description of the glass bodies, identification of the cyrstal phases present where determined via X-ray diffraction analysis, the coefficient of expansion over the range of 0°–300° C. where measured ($\times 10^{-7}/°$ C.), a qualitative determination of the sample magnetism, and the temperature achieved after 1, 2, 3, or 5 minutes heating in an induction coil.

Samples about 1 × 1 × 0.5 inches were employed in the heating trials. The coil was a cylindrical winding about 6.25 × 5 inches composed of eight turns of 0.625 inches diameter conduction wire. Within the coil was a concentric ceramic coil with a 0.25 inch wall thickness and additional asbestos packing for thermal insulation. The sample was mounted on an asbestos pad atop a ceramic pedestal and was situated at the geometric center of the cylinder. The unit operated at 10 kilowatts and 10 kilohertz to provide an oscillating magnetic field having a peak of about 800 oersteds. The temperature of the sample was monitored by a chromel-alumel thermocouple in contact with the sample surface and a potentiometer. Because the samples are not electrically conductive in bulk, it is thought that the heating effect is caused mainly by energy dissipated in the sample during the rapid magnetization-demagnetization process, frequently defined as the hysteresis loss.

Table II records temperatures reached after 1, 2, 3, or 5 minutes continuous heating. In the majority of cases, the temperature achieved after a 5-minute exposure was close to the maximum temperature demonstrated by the sample after heating for 6–7 minutes. All the glass samples had glassy black interiors which exhibited typical conchoidal fracture patterns.

Second, these superior compositions demonstrate two factors which are important to attain efficient heating performance at low iron concentrations: (1) relatively high boron contents (Examples 5 and 6); and (2) low amounts of the $TiO_2$ and/or $ZrO_2$ nucleating agents (Examples 7 and 8). Both of these features tend to promote spontaneous magnetite crystallization in the glasses. At low iron concentrations, viz., less than about 10% by weight, and normal redox melting conditions, i.e., melting in an air environment, the non-magnetic crystal phase hematite tends to develop preferentially. At about 12% FeO, magnetite becomes the predominant phase, this again illustrating the need for glasses with relatively high iron levels. Examples 10, 11, 13, and 14 demonstrate that the preferred glasses will consist essentially solely of the recited base ingredients. Hence, the inclusion of extraneous components customarily results in a reduction of the amount of magnetite crystallized. Examples 13 and 14 indicate that glasses which crystallize a ferrite phase exhibit less efficient inductive heating than the comparable FeO-containing glass (Example 15) which contains magnetite as the predominant crystal phase.

Table III sets forth heat treatment schedules A–I which were applied to exemplary precursor glasses

TABLE II

| Example No. | Appearance | Crystal Phases | Coef. Exp. | Temperature After 1 min. | 2 min. | 3 min. | 5 min. | Magnetism |
|---|---|---|---|---|---|---|---|---|
| 1 | Dark olive | Little hematite, trace magnetite | — | — | — | — | — | Weak |
| 2 | Orange brown | Hematite, trace magnetite | 43.3 | 46 | 69 | 92 | 135 | Weak |
| 3 | Orange | Magnetite, trace hematite | 45.6 | 90 | 173 | 262 | 402 | Moderate |
| 4 | Dark orange-brown | " | — | 84 | 141 | 205 | 332 | Strong |
| 5 | " | " | 52.3 | 89 | 172 | 274 | 397 | " |
| 6 | Dark violet-brown | " | — | 97 | 186 | 288 | 400 | " |
| 7 | Dark brown | " | — | 210 | 332 | 391 | 422 | Very strong |
| 8 | " | " | — | 208 | 327 | 383 | 416 | " |
| 9 | Dark red-brown | " | — | 107 | 189 | 268 | 340 | Strong |
| 10 | Dark yellow-brown | Weak magnetite, weak hematite | — | 137 | 200 | 232 | 257 | Moderate |
| 11 | " | " | — | 77 | 124 | 170 | 256 | Weak |
| 12 | Dark gray-brown | Magnetite | 54.1 | 128 | 213 | 289 | 348 | Moderate |
| 13 | Black | Cobalt ferrite | — | 143 | 211 | 240 | 255 | Weak |
| 14 | Black-brown | Nickel ferrite | — | — | — | — | — | Weak |
| 15 | Brown-gray | Magnetite | 46.9 | 216 | 305 | 344 | 364 | Strong |
| 16 | Black | Magnetite | — | — | — | — | — | Strong |
| 17 | " | " | — | — | — | — | — | " |
| 18 | " | " | — | — | — | — | — | " |
| 19 | " | " | 61 | — | — | — | — | Very strong |
| 20 | Red-brown | " | 55 | — | — | — | — | " |
| 21 | " | " | 71 | — | — | — | — | " |
| 22 | " | " | 45 | — | — | — | — | " |
| 23 | " | " | — | — | — | — | — | " |
| 24 | " | " | — | — | — | — | — | Strong |
| 25 | Red-brown | Magnetite | — | — | — | — | — | Very strong |
| 26 | " | " | — | — | — | — | — | " |
| 27 | " | " | — | — | — | — | — | " |
| 28 | " | " | — | 138 | 234 | 303 | — | " |
| 29 | Dark Brown | Magnetite, trace hematite | — | — | — | — | — | " |
| 30 | Light brown | " | — | — | — | — | — | " |
| 31 | Gray-brown | — | — | — | — | — | — | " |
| 32 | Dark brown | — | — | — | 170 | 307 | 373 | " |
| 33 | Light brown | — | — | — | — | — | — | " |

A comparison of Tables I and II points up several general observations. First, although the quantity of magnetite precipitated in the glass upon cooling from the melt and, consequently, the inductive heating effect, appears to increase with increasing FeO levels in the glass, an inspection of the two tables indicates that as little as 10% FeO can give rise to useful heating effects and that quite efficient heating is achievable in compositions containing 12% FeO. Hence, as can be seen, several such compositions approach or exceed 400° C.

1–33 utilizing an air atmosphere in an electrically-heated furnace. Customarily, the schedules produced a body having a dull surface appearance, although in several instances a lustrous appearance resulted. In general, the interior microstructure of the glass-ceramics was highly crystalline with the crystals, themselves, being very fine-grained, i.e., less than about 5 microns in diameter with the majority being less than one micron in diameter. The $Na_2O$ and/or $K_2O$-containing glasses free from or containing less than about 15% $Al_2O_3$ did not exhibit internal crystallization. Rather, the articles developed cristobalite crystals in the surface only. At the conclusion of each crystallization treatment, the articles were cooled to room temperature at furnace rate, i.e., the electric powder was extinguished and the furnace allowed to cool with the articles retained therein. This cooling rate was estimated to vary between about 3°-5° C./minute.

TABLE III

| | |
|---|---|
| Schedule A: | Heat at 300° C./hour to 800° C. |
| | Hold thereat for five hours |
| Schedule B: | Heat at 300° C./hour to 900° C. |
| | Hold thereat for five hours |
| Schedule C: | Heat at 300° C. to 750° C. |
| | Hold thereat for four hours |
| | Heat at 200° C./hour to 900° C. |
| | Hold thereat for four hours |
| Schedule D: | Heat at 300° C./hour to 1000° C. |
| | Hold thereat for 5 hours |
| Schedule E: | Heat at 300° C./hour to 700° C. |
| | No hold |
| | Heat at 200° C./hour to 1000° C. |
| | Hold thereat for six hours |
| Schedule F: | Heat at 300° C./hour to 800° C. |
| | Hold thereat for 1.5 hours |
| | Heat at 125° C./hour to 1050° C. |
| | Hold thereat for one hour |
| Schedule G: | Heat at 300° C./hour to 750° C. |
| | No hold |

TABLE III-continued

| | |
|---|---|
| | Heat at 30° C./hour to 850° C. |
| | No Hold |
| | Heat at 200° C./hour to 1100° C. |
| | Hold thereat for two hours |
| Schedule H: | Heat at 300° C./hour to 800° C. |
| | Hold thereat for four hours |
| | Heat at 300° C./hour to 900° C. |
| | Hold thereat for four hours |
| Schedule I: | Heat at 300° C./hour to 700° C. |
| | Hold thereat for four hours |
| | Heat at 300° C./hour to 950° C. |
| | Hold thereat for four hours |

Obviously, other modifications in heating and cooling rates, as well as dwell periods, are possible. Such are, however, deemed to be well within the technical ingenuity of the ordinary worker in the glass-ceramic art.

Table IV reports the crystallization heat treatments applied to the glass articles of Table I along with a visual description of the resultant body, the internal crystallization developed in situ, as identified through X-ray diffraction analyses (s.s. represents solid solution), temperatures achieved after 1, 2, 3, or 5 minutes continuous heating utilizing the same induction coil apparatus described above with respect to the glass samples, and the coefficient of thermal expansion over the range of 0°-300° C. where measured.

TABLE IV

| Example No. | Heat Treatment | Appearance | Crystal Phases | Coef. Exp. | Temperatures After 1 min. | 2 min. | 3 min. | 5 min. |
|---|---|---|---|---|---|---|---|---|
| 1 | A | Glossy brown | — | 6.7 | 50 | 72 | 93 | 127 |
| 2 | A | Glossy violet-brown | — | 9.8 | 108 | 182 | 237 | 300 |
| 3 | A | Dull violet | — | 11.1 | 128 | 211 | 269 | 335 |
| 4 | B | Dull violet-gray | — | — | 144 | 246 | 303 | 349 |
| 5 | A | Violet-gray luster | Beta-spodumene s.s., magnetite hematite | 11.8 | 124 | 206 | 271 | 336 |
| 5 | B | Dull gray | — | — | 145 | 235 | 291 | 343 |
| 6 | B | Dull slate | Beta-spodumene s.s., magnetite hematite | — | 139 | 223 | 272 | 322 |
| 7 | B | Dull gray | Beta-spodumene s.s., magnetite, trace hematite | — | 152 | 239 | 287 | 332 |
| 8 | A | Gray luster | — | — | 160 | 256 | 308 | 350 |
| 8 | B | Dull gray | — | — | 157 | 238 | 282 | 323 |
| 9 | B | Dull violet-gray | — | — | 125 | 208 | 271 | 330 |
| 10 | B | Dull gray | Beta-spodumene s.s., magnetite, gahnite, trace cristobalite, trace hematite | — | 161 | 252 | 300 | 338 |
| 10 | D | Slate | — | — | 176 | 265 | 308 | 311 |
| 11 | B | Dull slate | — | — | 135 | 213 | 261 | 305 |
| 12 | A | Dull gray | Beta-spodumene s.s., magnetite, hematite | 14.8 | 138 | 220 | 270 | 315 |
| 12 | C | " | " | — | 190 | 276 | 317 | 343 |
| 12 | E | " | " | — | 132 | 202 | 245 | 290 |
| 13 | A | Charcoal | — | — | 113 | 197 | 227 | 241 |
| 13 | C | " | — | — | 101 | 183 | 224 | 250 |
| 13 | E | Charcoal | Beta-spodumene, s.s., cobalt ferrite | — | 143 | 211 | 240 | 255 |
| 14 | E | Sooty brown | Beta-spodumene s.s., nickel ferrite | — | 93 | 131 | 155 | 178 |
| 15 | A | Dark violet-gray | alpha-quartz s.s., beta-spodumene s.s., magnetite, $ZrTiO_4$ s.s. | 91.2 | 220 | 327 | 362 | 378 |
| 15 | F | Dull violet-gray | — | — | 172 | 240 | 263 | 275 |
| 15 | G | " | — | — | 185 | 242 | 264 | 278 |
| 16 | H | Dull red-brown | — | — | — | — | — | — |
| 17 | H | " | — | — | — | — | — | — |
| 18 | H | " | Beta-spodumene s.s., beta-quartz s.s., magnetite | 25 | — | — | 370 | — |
| 19 | I | | Cristobalite in surface, magnetite in interior | | | | | |

TABLE IV-continued

| Example No. | Heat Treatment | Appearance | Crystal Phases | Coef. Exp. | Temperatures After 1 min. | 2 min. | 3 min. | 5 min. |
|---|---|---|---|---|---|---|---|---|
| 20 | I | | " | | | | | |
| 21 | I | | " | | | | | |
| 22 | I | | Mullite, magnetite | | | | | |
| 23 | I | | " | | | | | |
| 24 | I | | " | | | | | |
| 25 | I | | Cristobalite in surface, magnetite in interior | | | | | |
| 26 | I | | " | | | | | |
| 27 | I | | " | | | | | |
| 28 | I | | " | | | | | |
| 29 | A | Dark gray | — | 22.6 | 205 | 366 | 426 | — |
| 29 | H | Dark gray | Beta-spodumene s.s., magnetite | 24.5 | 223 | 330 | 376 | — |
| 30 | H | Dull slate | Beta-spodumene s.s., magnetite, hematite | 27.4 | 240 | 355 | 394 | — |
| 31 | A | Gray-violet | — | 53.0 | 296 | 437 | 459 | — |
| 32 | A | Gray | — | 51.0 | 170 | 365 | 431 | — |
| 32 | H | Dull gray | Beta-spodumene s.s., magnetite | 34.6 | 275 | 391 | 418 | — |
| 33 | A | Gray | — | 38.0 | 195 | 395 | 437 | — |

Table IVA reports wet chemical iron oxide analyses in weight percent performed upon two of the exemplary glass-ceramics of Table IV.

TABLE IVA

| Example | Heat Treatment | Total Iron As FeO | Ferrous Iron As FeO | Ferrous Iron/ Total Iron |
|---|---|---|---|---|
| 7 | B | 12.8 | 6.2 | ~48% |
| 10 | B | 12.5 | 6.4 | ~51% |
| $Fe_2O_3$ | (theoretical) | | | ~33% |

As can be seen, within experimental error the analyses are essentially the same as those for the glasses reported in Table IA.

A comparison of Tables II and IV clearly illustrates that the crystallization in situ heat treatment substantively affects induction heating efficiency; thus, both increased and decreased efficiencies can be observed. X-ray diffraction analyses confirm that the marked increases in efficiency observed in the glass-ceramic articles vis-a-vis the parent or precursor glasses are effected through increases in the amount of magnetite grown during the crystallization heat treatment. Although less obvious, the decreased efficiency of Example 6 with heat schedule B, as an illustration, may be associated with increased hematite development during the heat treatment, presumably at the expense of magnetite. In any event, it is apparent that several exemplary compositions containing 8-16% by weight FeO exceed the arbitrary inductive heating rate of 250° C. after 3 minutes.

The presence of relatively high boron levels and low concentrations of $TiO_2$ and/or $ZrO_2$ is important to the formation of satisfactory glass-ceramic articles. $B_2O_3$ contents above about 2% by weight inhibit surface spalling and cracking during the crystallization heat treatment. Low $TiO_2$ and/or $ZrO_2$ nucleant levels are operable because the high iron levels in the compositions assist in the nucleation process. It is believed that iron in the form of $Fe_2O_3$ aids nucleation. Where the concentration of iron is totally reduced to FeO, as by melting in an atmosphere of forming gas, hydrogen, or other reducing environment, only surface crystallization is produced. Moreover, glasses which contain comparable levels of $TiO_2$ (equivalent to $TiO_2 + ZrO_2$ on a molar basis) will not develop fine-grained glass-ceramics in these composition systems. Also, $TiO_2$ tends to cause the formation of pseudobrookite ($Fe_2TiO_5$), ilmenite ($FeTiO_3$), or ulvospinel ($Fe_2TiO_4$) solid solution in competition with the desired magnetite phase. In contrast, the presence of $TiO_2 + ZrO_2$ tends to lead to the preferential crystallization of $ZrTiO_4$, thereby removing one potential impediment to efficient magnetite development.

Table IV makes clear that glass-ceramics in the $Li_2O$-$B_2O_3$-$Al_2O_3$-FeO-$SiO_2$ composition system can have coefficients of thermal expansion sufficiently low to be suitable for use as top-of-stove cooking ware. Example 15, containing high FeO and low $Li_2O$ contents, exhibits an undesirably high coefficient of thermal expansion resulting from the presence of a substantial quantity of alpha-quartz s.s. crystallization. That failing is readily correctable with an adjustment in the $Al_2O_3/Li_2O$ ratio as illustrated in the other examples.

Examples 19-21 and 25-28 demonstrate the need for the presence of substantial quantities of $Al_2O_3$ in the $Na_2O$ and/or $K_2O$-$B_2O_3$-$SiO_2$ compositions, viz., at least 15%, in order to achieve body crystallization in situ.

We claim:

1. A glass article which will demonstrate efficient and uniform heating when placed in an oscillatory magnetic field and containing magnetite crystals dispersed throughout the body thereof, said glass article having an overall composition, expressed in weight percent on the oxide basis as calculated from the batch, selected from the groups (a) 2-10% $Na_2O$ and/or $K_2O$, 5-20% $B_2O_3$, 15-40% FeO, 0-32% $Al_2O_3$, and 35-65% $SiO_2$; and (b) 1.5-6% $Li_2O$, 10-40% FeO, 10-20% $Al_2O_3$, 45-66% $SiO_2$, 0-5% $TiO_2$ and/or $ZrO_2$, and 0-5% $B_2O_3$, at least 1% $B_2O_3$ being required when the proportion of FeO is less than 15%.

2. A glass-ceramic article which will demonstrate efficient and uniform heating when placed in an oscillatory magnetic field, said article consisting essentially of crystals dispersed within a glassy matrix, said glass-ceramic article having an overall composition, expressed in weight percent on the oxide basis as calculated from the batch, selected from the groups (a) 2-10% $Na_2O$ and/or $K_2O$, 5-20% $B_2O_3$, 15-40% FeO, 15-32% $Al_2O_3$, and 35-50% $SiO_2$; and (b) 1.5-6% $Li_2O$, 10-40% FeO, 10-20% $Al_2O_3$, 45-66% $SiO_2$, 0-5% $TiO_2$ and/or $ZrO_2$, and 0-5%

$B_2O_3$, at least 1% $B_2O_3$ being required when the proportion of FeO is less than 15%.

3. A glass-ceramic article according to claim 2 wherein the crystals therein consist essentially of magnetite along with beta-quartz solid solution and/or beta-spodumene solid solution, and said article has a coefficient of thermal expansion (0–300° C.) of less than about $40 \times 10^{-7}/°$ C.

* * * * *

UNITED STATES PATENT AND TRADEMARK OFFICE
CERTIFICATE OF CORRECTION

PATENT NO. : 4,140,645
DATED : February 20, 1979
INVENTOR(S) : George H. Beall and Richard F. Reade It is certified that error appears in the above-identified patent and that said Letters Patent are hereby corrected as shown below:

Column 2, line 66, change "0.5%" to --0-5%--.

Column 3, line 17, change "composition" to --compositions--.

Column 6, line 63, change "cyrstal" to --crystal--.

Column 12, line 42, change "si0$_2$" to --SiO$_2$--.

Signed and Sealed this

Nineteenth Day of February 1980

[SEAL]

Attest:

SIDNEY A. DIAMOND

Attesting Officer

Commissioner of Patents and Trademarks